United States Patent [19]

Isaksson et al.

[11] Patent Number: 5,013,341
[45] Date of Patent: May 7, 1991

[54] APPARATUS FOR SEPARATING PARTICULATE MATERIAL FROM HIGH-TEMPERATURE GASES

[75] Inventors: Juhani Isaksson, Karhula, Finland; Dave B. Russell, San Diego, Calif.

[73] Assignee: A. Ahlstrom Corporation, Finland

[21] Appl. No.: 574,550

[22] Filed: Aug. 29, 1990

Related U.S. Application Data

[63] Continuation of Ser. No. 378,628, Jul. 12, 1989, abandoned.

[51] Int. Cl.$^5$ .............................................. B01D 46/04
[52] U.S. Cl. ........................................ 55/302; 55/523
[58] Field of Search .................................. 55/302, 523

[56] References Cited

U.S. PATENT DOCUMENTS

| | | | |
|---|---|---|---|
| 4,342,574 | 8/1982 | Fetzen | 55/523 X |
| 4,468,240 | 8/1984 | Margraf | |
| 4,543,113 | 9/1985 | Forester et al. | 55/523 X |
| 4,584,003 | 4/1986 | Oda et al. | |
| 4,655,806 | 4/1987 | Bowersox | 55/302 X |
| 4,730,454 | 3/1988 | Pischinger et al. | 55/302 X |
| 4,735,638 | 4/1988 | Ciliberti et al. | 55/302 |
| 4,764,190 | 8/1988 | Israelson et al. | 55/302 X |
| 4,865,627 | 9/1989 | Dewitz et al. | 55/302 X |

FOREIGN PATENT DOCUMENTS 61-268330 8/1986 Japan .

Primary Examiner—Charles Hart
Attorney, Agent, or Firm—Nixon & Vanderhye

[57] ABSTRACT

In accordance with the present invention, there is provided a filter housing comprising a plurality of open-ended parallel hollow gas permeable filter elements for separating particulate material from a high-temperature gas. The filter housing comprises at least a pair of cross sectional support plates having apertures therethrough, for dividing the filter housing into at least three sections and for supporting the filter elements. The support plates divide the filter housing into a first end section having an inlet for dirty gas, a second end section in connection with a discharge port for separated particulate material, and an intermediate filtration chamber section therebetween. The filter elements are arranged in the intermediate filtration chamber extending from the first support plate to the second support plate. The end portions of the filter elements are affixed to the apertures through the support plates. Inlet openings of the filter elements are arranged in communication with the first end section of the filter housing, for introducing dirty gas into the filtration elements. Outlet openings of the filter elements are in communication with the second end section, for discharging separated particulate material from the filter elements. A clean gas outlet conduit is in communication with the clean gas space in the intermediate filtration chamber, for discharging clean gas from the filter housing. It is an important feature of the present invention that means are provided inside said filter housing for supplying a reverse flow pressure pulse of high energy gas into said filtration chamber, for cleaning the porous filter medium. The reverse-flow pressure pulse can be supplied through a relatively small pipe connected to a compressor.

20 Claims, 5 Drawing Sheets

APPARATUS FOR SEPARATING PARTICULATE MATERIAL FROM HIGH-TEMPERATURE GASES

This is a continuation of application Ser. No. 07/378,628, filed July 12, 1989, now abandoned.

FIELD OF THE INVENTION

The present invention relates to an apparatus and a method for separating particulate material from high-temperature gases. The present invention relates especially to a high-temperature gas filtering apparatus comprising gas-permeable filter elements and means for periodically cleaning the filter elements.

BACKGROUND AND SUMMARY OF THE INVENTION

Modern combustion and gasification methods have resulted in a need for particle separators capable of efficiently and reliably separating particulate material from high-temperature combustion or product gases. In circulating fluidized bed combustion or gasification processes large amounts of dust such as solid bed material, ashes, unburnt fuel and even reactive absorbents, i.e., for sulphur capture, are continuously entrained with the exhausted high-temperature gases from the combustion chamber and recirculated back into the combustion chamber after having been separated from the hot gases. The separators used have to endure hot and corrosive conditions in the solids circulating reliability. Besides affecting the circulating fluidized bed process itself, an effective separator, by removing particulate material, minimizes fouling of heat exchange surfaces in the subsequent gas path.

In modern combined cycle power plants, where hot combustion gases are expanded in gas turbines, efficient cleaning systems for the high-temperature gases greatly extend the life and operation time of the gas turbines, since particulate matter in hot gases greatly increase erosion and fouling of turbine blades.

The present day concern with air pollution has on the other hand also created a demand for efficient dust collecting apparatuses of increased capacity, even with the capability of handling high-temperature gases.

Different kinds of particle separators for the gas cleaning processes have been proposed and constructed to achieve the needed reliable separation of solid particular matter from high-temperature and often also high-pressure gases. In recent years, gas-permeable high-temperature filters have become an interesting alternative to conventional vertical cyclone separators for separating particulate material from these high-temperature gases. Conventional vertical cyclones require substantial space both for the cyclone itself and for cyclone support constructions. Filter separators, on the other hand, can be built into substantially compact and simple systems. Filters made of porous super alloys or ceramics can endure the high-temperature conditions and do not need to be protected by cooling surfaces or refractory linings as do conventional cyclones. In pressurized processes, filter separators can very easily be integrated into the pressurized system.

In filter separators, dust accumulates gradually on the surface of the porous material and the filter has to be cleaned periodically. If large amounts of dust are allowed to accumulate on the filter surface, a large pressure difference is built up between both sides of the filter and increased pressure i.e. energy is needed for leading the gas therethrough.

Filters such as bag filters, for low temperature gases, have been cleaned by shaking, agitating, vibrating or even brushing or scraping thereby loosening dust layers accumulated on the filter medium. High-temperature rigid ceramic filters such as long, thin tube filters may be very fragile and consequently be damaged by such rough treatment.

The cleaning of rigid ceramic filters is usually arranged as reverse cleaning, by reverse flowing of clean gas through the filter medium. During reverse cleaning the main separation process in the filter separator has to be stopped in order to let the clean gas flow back through the filter. This is, of course, an undesirable interruption in continuous processes.

It has also been suggested to clean filter tubes by injecting compressed air pulses periodically into the tubes. Compressed air operates in a pulsed manner and releases dust from the filter tube surfaces. Each filter tube has to have either a compressed air injector of its own, or a common movable injector for several tubes has to be used in order to ensure cleaning of all filter tubes. U.S. Pat. No. 4,468,240 shows a filtering separator having a filter cleaning apparatus of the above mentioned type. The separator has a housing divided into a dust laden gas space and a clean gas space. Filter tubes are disposed in the gas laden space. Clean gas flows from outside into the filter tubes and out through the filter tube wall into the clean gas space. The cleaning of filter tubes is accomplished by supplying compressed air, from an injector in a reciprocatingly displaceable chamber disposed in the clean space, into the filter tubes, which are to be cleaned. The construction is very complicated and space consuming.

In U.S. Pat. No. 4,584,003 is disclosed a filter separator comprising a filter housing having vertically arranged filtration tubes and horizontally arranged filtration tube supporters dividing the filter housing into several compartments. Dust laden gas is introduced into the filtration tubes at their upper end and separated particles are discharged from their lower end. Clean gas flows through the porous tube walls into a clean gas space surrounding the tubes. Each clean space has one clean gas outlet. The filter separator is compact and simple in structure. A cleaning method for the aforementioned filter separator is disclosed in Japanese patent application No. 61-268330. A diffuser is arranged in each clean gas outlet pipe outside the filter housing. Gas from a high-pressure compressor is introduced through the diffuser throat and the clean gas outlet pipe into the clean gas space. The high-pressure gas jet also takes in circumferential clean gas from the gas outlet conduit by the ejector effect of the throat and creates a large backwashing gas stream. The main separation process does not have to be stopped during the backwashing stage.

When filtering high-temperature and high-pressure gases, the diffusers in the clean gas outlet pipes become very space consuming. The diffusers themselves are relatively large and form long projections out to one side of the filter separator. As the backwashing gas has to be of almost the same temperature as the hot gas in the filter housing to avoid thermal shocks on the filters, the diffuser and the clean gas outlet pipe have to be very well insulated, which substantially adds to the size of the elements projecting out from the filter housing. This makes the otherwise compact filter housing less attractive from a constructional point of view.

OBJECT OF THE INVENTION

It is an object of the present invention to minimize the drawbacks of the known filter surface cleaning systems. It is another object of the invention to provide a filter cleaning system which can be utilized without disturbance to the separation operation. It is further an object of the invention to provide a compact and simple filter separator for high temperature gas cleaning purposes. It is still further an object of the present invention to provide an easily modulated apparatus for separating particulate material from high temperature gases.

SUMMARY OF THE INVENTION

In accordance with the present invention, there is provided a filter housing comprising a plurality of open-ended parallel hollow gas permeable filter elements for separating particulate material from a high-temperature gas. The filter housing comprises at least a pair of cross sectional support plates having apertures therethrough, for dividing the filter housing into at least three sections and for supporting the filter elements. The support plates divide the filter housing into a first end section having an inlet for dirty gas, a second end section in connection with a discharge port for separated particulate material, and an intermediate filtration chamber section therebetween. The filter elements are arranged in the intermediate filtration chamber extending from the first support plate to the second support plate. The end portions of the hollow, gas permeable filter elements are affixed to the apertures through the support plates. The gas permeable filter elements permit clean gas to flow from the hollow space inside the filter elements through the gas-permeable side portions into the clean gas space in the intermediate filtration chamber. Inlet openings of the filter elements are arranged in communication with the first end section of the filter housing, for introducing dirty gas into the filtration elements. Outlet openings of the filter elements are in communication with the second end section, for discharging separated particulate material from the filter elements. A clean gas outlet conduit is in communication with the clean gas space in the intermediate filtration chamber, for discharging clean gas from the filter housing. It is an important feature of the present invention that means are provided inside said filter housing for supplying a reverse flow pressure pulse of high energy gas into said filtration chamber, for cleaning the porous filter medium. The reverse-flow pressure pulse can be supplied through a relatively small pipe connected to a compressor.

The present invention is especially suitable for filter separators in pressurized systems. The cleaning system can advantageously be built in vertical, cylindrical pressure-proof housings.

Cleaning gas pulse jets are preferably arranged in communication with clean gas outlet conduits in the inlet end of the conduits. The cleaning gas may be fed through gas nozzles arranged in coaxial alignment with the inlet ends of the clean gas outlet conduits. For preventing the high-pressure cleaning gas pulses from entering into the clean gas outlet conduits, there are arranged venturi means inside the inlet means of the clean gas outlet conduits. As the cleaning gas pulse is blown in the throat portion of the venturi, a plug of gas is formed in the throat preventing clean gas from leaking out. The gas pulse is very short and does not disturb the overall separation process.

The inlet end of the clean gas outlet conduit containing the ejector may be arranged to extend into the clean gas space in the filtration chamber. According to one embodiment of the invention, the clean gas conduit is arranged parallel to the longitudinal direction of the filtration elements. The clean gas outlet may be arranged to pass out from the filtration chamber either through an upper first end section, or through a lower second end section and then through the end wall out from the filter housing.

According to the invention, there may be additional intermediate cross sectional support plates in the filtration chamber to divide the chamber into two or more clean gas compartments. Each compartment may have its own clean gas outlet conduit and cleaning gas nozzle.

The clean gas conduits from the separate compartments may have separate outlet ports through the filter housing wall, or may preferably be combined so that the gases are discharged through one common gas outlet port. In pressurized systems it is advantageous to arrange as small and as few ports through the pressure vessel wall as possible. The clean gas conduits can, according to a further embodiment of the present invention, be arranged to lead clean gas from one clean gas compartment into the next adjacent clean gas compartment and finally out through either end section and corresponding end wall.

According to still another embodiment of the present invention, there is provided a separate clean gas discharge chamber adjacent the filtration chamber. Clean gas outlet conduits are arranged to lead from each clean gas compartments into the common clean gas discharge chamber. There may then be only one clean gas outlet port in the surrounding filter housing. The clean gas discharge chamber may be, for example, arranged in a vertical cylindrical pressure vessel parallel to an upright filtration chamber and extending from an upper filter tube support plate to a lower support plate. Only a clean gas outlet port may then be needed in the cylindrical side wall of the pressure vessel.

The filter elements used in an apparatus according to the present invention may be filter tubes or elements forming filtration channels therebetween. The filter elements may be made of porous ceramic materials or super alloys.

The present invention provides a smaller and more compact particle separation system without protruding (voluminous), large insulated outlet ports or diffuser arrangements. There is no need to leave space outside the filter vessel itself for these protruding elements or support constructions. The filter housing itself may be somewhat bigger but it can easily be taken into consideration when constructing filtering systems. The systems also can easily be modulated, and the filter systems can be more easily predimensioned and predesigned.

The present invention thus provides an improved design of a filter module. Previous designs have had multiple vessel exits coming from the side of the pressure vessel. According to the present invention the filter module can be designed with even only one gas exit from the bottom, top or side of the vessel. Especially in pressurized systems, and hot systems all expansion joints between the main filter housing and any outlet ports are weak points in the systems and therefore the number of outlet or inlet ports should be kept at a minimum.

Only one exit in the bottom of the vessel is required by arranging filter tubes in an annular pattern in the filtration chamber, and the clean gas outlet conduit comprising the cleaning ejector in the center of the filtration chamber. Center outlet from multiple compartments is accomplished by splitting the clean gas outlet conduit into as many branches as there are compartments and routing all of the branches through the lowest compartment in the bottom or through the lower end section of the filter housing. All except one clean gas outlet conduit branch is then led through the next compartment above and so forth. Fly ash may be collected in multiple hoppers at the bottom end section and discharged through a pipe at the bottom of each hopper.

A more compact arrangement can thus be achieved and a single connection for clean, hot flue gas outlet. The assembly and inspection of the filter housing is also made much easier.

DETAILED DESCRIPTION OF THE DRAWINGS

Figure 1:
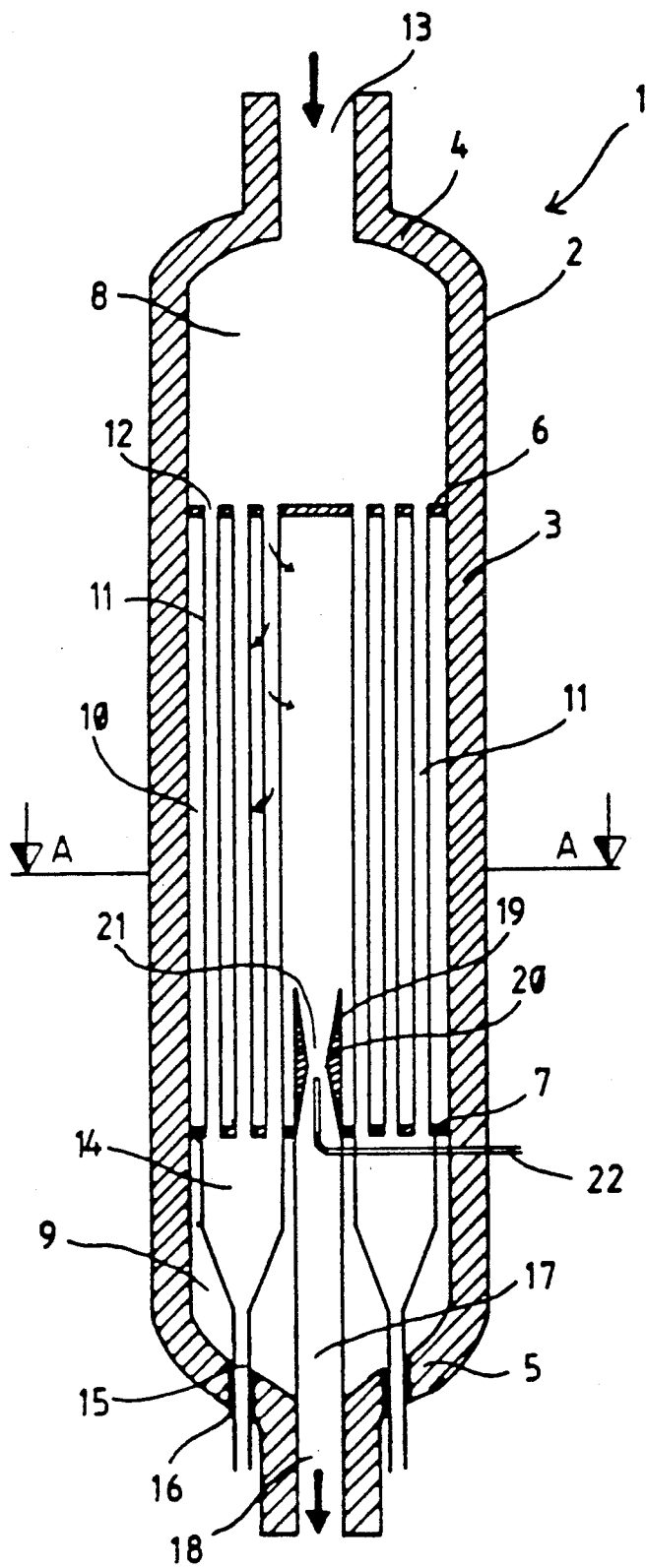
FIG. 1 is a schematic vertical cross-sectional view of a filtering separator according to the present invention.

Referring now to the drawings, identical parts are marked by identical reference symbols in all embodiments.

In FIG. 1, there is illustrated a filter separator 1 comprising a substantially vertical cylindrical filter housing 2. The filter housing has insulated side walls 3 and upper and lower end walls 4 and 5. The filter housing is divided by two support plates or tube sheets 6 and 7 into three sections, a first upper end section 8, a second lower end section g and an intermediate section or filtration chamber 10.

Openended hollow filter tubes 11 are arranged in the filtration chamber 10 to extend from the upper support plate to the lower support plate. The filter tubes are affixed to openings 12 in the upper and lower support plates, thus connecting the space in the upper end section with the space in the lower end section. In the upper end section there is disposed a dirty gas inlet 13 through which gas containing particulate matter can be introduced into the filter separator. Clean gas flows from inside the hollow filter tubes 11 through the tube walls into the clean gas space in the filtration chamber 10. Particles are detained inside the filter tubes.

In the lower end section, hoppers 14 are disposed below openings 12 connected to filter tubes 11. The hoppers collect particulate material separated from the dirty gas in the filter tubes. The hoppers have discharge pipes 15 connected to their bottoms, for discharging collected particles out from the filter housing through small openings 16 arranged in the lower end wall 5.

In the center of the lower support plate 7 a clean gas outlet conduit 17 is arranged to extend into the filtration chamber 10. The clean gas outlet conduit is further arranged to pass through the lower end section g and through an opening 18 in the lower end wall 5.

The inlet end 19 of the clean gas outlet conduit 17 is formed as a venturi 20 having a throat portion 21. A relatively small pipe 22 is disposed in the clean gas outlet conduit for supplying a pulse of high pressure gas through the ejector 20 into the filtration chamber. The high pressure gas jet causes backflow of gas through the filter tube walls and loosens dust accumulated on the inner walls of the filter tubes.

Figure 2:
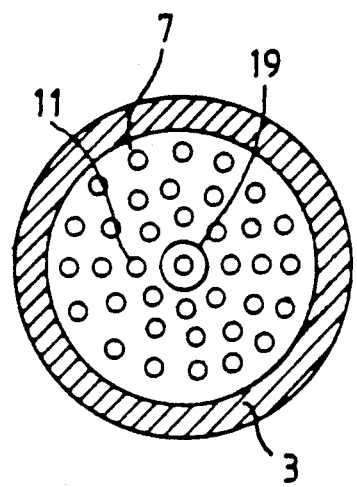
FIG. 2 is a cross-sectional view taken along line A—A of FIG. 1.

FIG. 2 illustrates a cross-sectional view of the above described separator taken along line A—A. The clean gas outlet conduit 17 is disposed in the middle of the housing 2 and the filter tubes 11 are disposed annularly around the conduit.

Figure 3:
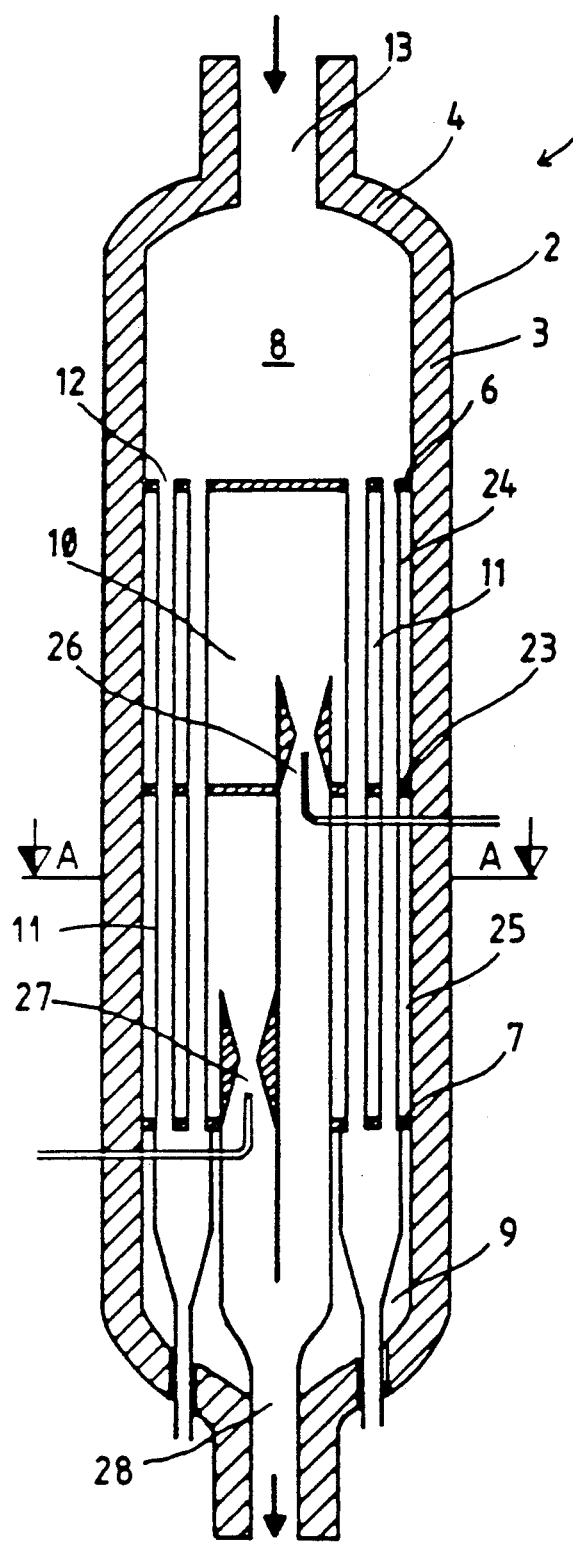
FIGS. 3, 5, 7 and 9 are schematic vertical cross-sectional views similar to FIG. 1 illustrating other embodiments of the present invention.
Figure 4:
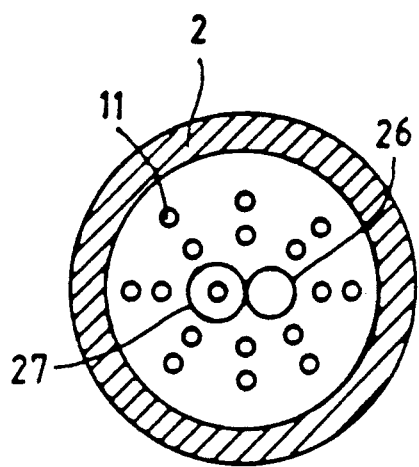
FIGS. 4, 6, 8 and 10 are cross-sectional views taken along lines A—A of FIGS. 3, 5, 7 and 9, respectively.

FIGS. 3 and 4 illustrate another embodiment of the present invention. An intermediate support plate 23 is disposed in the filtration chamber 10 to support the filter tubes. The support plate divides the chamber 10 into two separate clean gas compartments 24 and 25. Each compartment has a separate clean gas outlet conduit 26 and 27 extending downwards into the lower end section g of the filter housing. The conduits 26 and 27 are combined to one common outlet conduit 28. By combining the clean gas outlet conduits, only one outlet opening for clean gas is needed in the filter housing wall, which simplifies the construction considerably.

Figure 5:
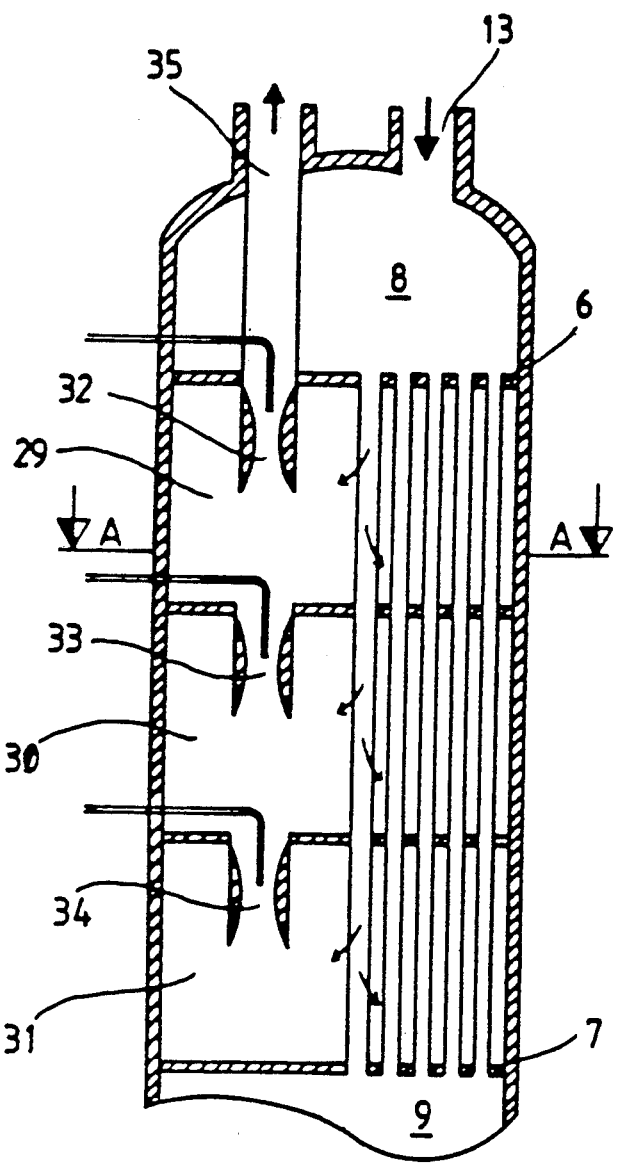
Figure 6:
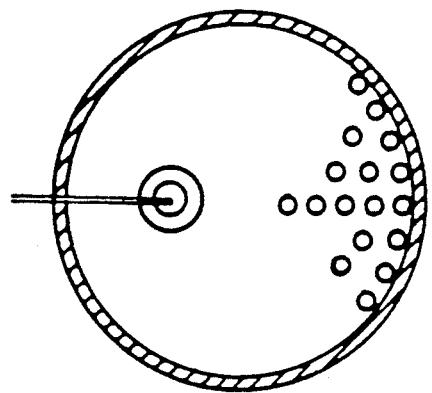

FIGS. 5 and 6 show still another embodiment of the present invention. The filtration chamber is divided by two intermediate support plates into three separate compartments 29, 30 and 31, each compartment having a clean gas outlet conduit 32, 33 and 34. The clean gas conduit 34 from compartment 31 leads gas into the adjacent compartment 30 and the clean gas conduit 33 leads gas from compartment 30 into compartment 29. The clean gas is discharged from the filtration chamber through conduit 32 which passes through the upper end wall 4 through an opening 35.

Figure 7:
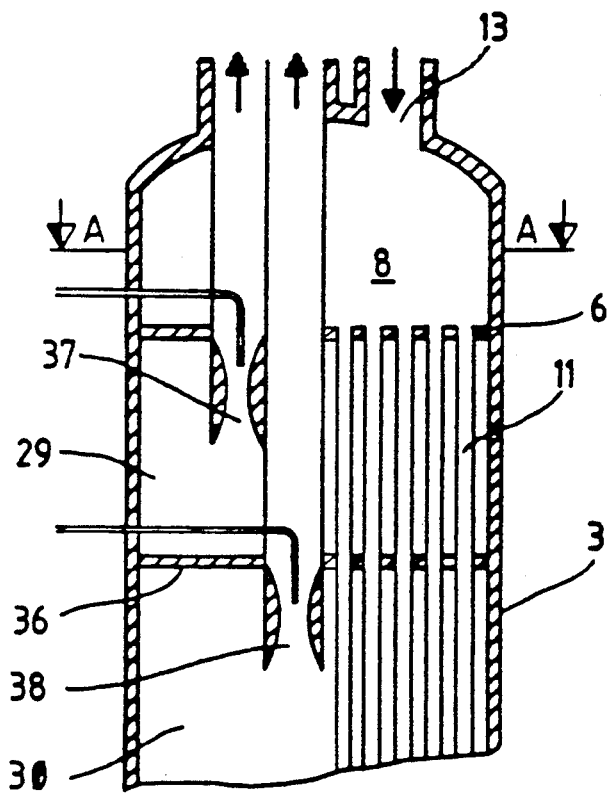
Figure 8:
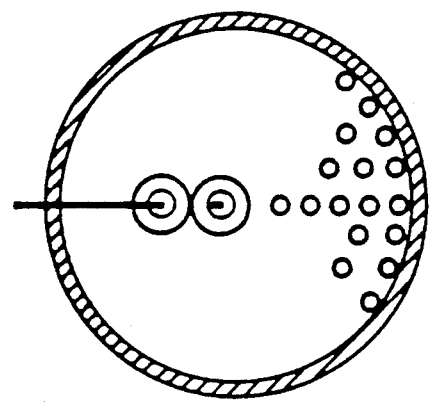

FIGS. 7 and 8 show a filter housing having the filtration chamber 10 divided by a support plate into compartments and having separate clean gas outlet conduits 37 and 38 arranged in each compartment. The outlet conduits pass according to this embodiment through separate openings in the upper end wall out from the filter housing. In the upper end wall, it is more easy to arrange outlet ports than in the cylindrical side wall 3.

Figure 9:
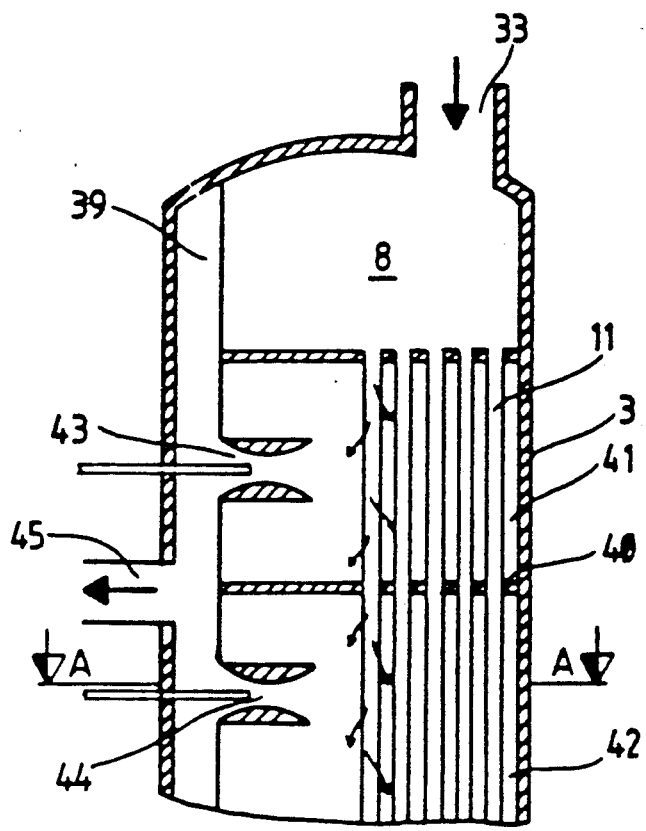
Figure 10:
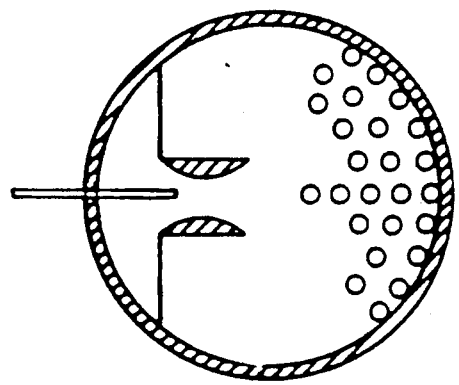

FIGS. 9 and 10 shown an embodiment of the present invention according to which a clean gas chamber 39 is arranged vertically parallel to the filtration chamber 10. The filtration chamber is divided by a support plate 40 into separate compartments 41 and 42. Both compartments have clean gas outlet conduits 43 and 44 arranged to discharge gas into the clean gas chamber 39. There is a clean gas outlet port 45 arranged in the cylindrical side wall 3. This embodiment can be advantageous if there is little or no space around the upper and lower ends of the filter housing to arrange clean gas outlets. There is still only one clean gas outlet and no space consuming diffusers.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An apparatus for separating particulate material from a high-temperature gas, comprising:
   a housing;
   a pair of cross-sectional support plates having apertures therethrough and dividing said housing into a first end section, a second end section and at least one intermediate filtration chamber therebetween;

an inlet for gas containing entrained particulate material in said first end section;

a discharge port for separated particulate material in said second end section;

a plurality of open-ended hollow elongated gas-permeable filter elements in said filtration chamber affixed at both end portions to the apertures through the support plates, said filter elements having inlet openings in communication with said first end section, outlet openings in communication with said second end section and gas permeable side portions permitting gas to flow in a first direction from the hollow, space inside the filter elements through the gas permeable side portion into said filtration chamber;

a clean gas outlet conduit in communication with said filtration chamber, said gas permeable filter elements permitting gas to flow through said elements into said clean gas outlet conduit; and means inside said housing for supplying a reverse flow pressure pulse of cleaning gas directly into said filtration chamber exteriorly of said filter elements and in a direction opposite said first direction for cleaning said filter elements.

2. An apparatus for separating particulate material according to claim 1 wherein said housing is a pressure-proof upright cylindrical vessel.

3. An apparatus for separating particulate material according to claim 1 wherein said means for supplying a reverse flow pressure pulse of cleaning gas includes a nozzle disposed in said filtration chamber in communication with the inlet end of the clean gas outlet conduit.

4. An apparatus for separating particulate material according to claim 3 wherein said nozzle is arranged in coaxial alignment with said inlet end of said clean gas outlet conduit.

5. An apparatus for separating particulate material according to claim 4 wherein said inlet end of said clean gas outlet conduit extends inside said filtration chamber and comprises a venturi arrangement and wherein said nozzle is arranged to blow cleaning gas into a throat portion of the venturi.

6. An apparatus for separating particulate material according to claim 5 wherein said gas outlet conduit is disposed parallel said filter elements in said filtration chamber.

7. An apparatus for separating particulate material according to claim 1 wherein a clean gas outlet conduit is arranged to pass through one of said cross sectional support plates separating the filtration chamber and the second end section from each other.

8. An apparatus for separating particulate material according to claim 1 wherein a clean gas outlet conduit is arranged to pass through one of said cross sectional support plates separating the filtration chamber and the first end section from each other.

9. An apparatus for separating particulate material according to claim 1 wherein said filtration chamber is divided into at least two separate clean gas compartments by at least one intermediate cross sectional support plate having apertures for the filter elements.

10. An apparatus for separating particulate material according to claim 9 wherein a clean gas outlet conduit is disposed in each clean gas compartment.

11. An apparatus for separating particulate material according to claim 10 wherein each clean gas outlet conduit is arranged to discharge clean gas from a separate clean gas compartment.

12. An apparatus for separating particulate material according to claim 10 wherein at least two clean gas outlet conduits are combined to a common clean gas exhaust line.

13. An apparatus for separating particulate material according to claim 10 wherein a clean gas outlet conduit from a clean gas compartment is arranged to lead clean gas into an adjacent clean gas compartment having a clean gas outlet conduit for discharging clean gas from the filtration chamber.

14. An apparatus for separating particulate material according to claim 10 wherein a clean gas discharge chamber is disposed parallel to the filtration chamber being divided into compartments, and said clean gas outlet conduits in said compartments are arranged to lead clean gas into said clean gas discharge chamber, and wherein, clean gas outlet conduit is connected to said clean gas discharge chamber for exhausting gas from said housing.

15. An apparatus for separating particulate material according to claim 1 wherein a clean gas outlet conduit is arranged to pass through an upper end wall of said housing.

16. An apparatus for separating particulate material according to claim 1 wherein a clean gas outlet conduit is arranged to pass through a lower end wall of said housing.

17. An apparatus for separating particulate material according to claim 1 wherein a clean gas outlet conduit is arranged to pass through a side wall of said housing.

18. An apparatus for separating particulate material according to claim 1 wherein said filter elements comprise tubes extending between said support plates.

19. An apparatus for separating particulate material according to claim 1 wherein said filter elements comprise channels extending between said support plates.

20. A filtering apparatus for separating solid particles from high-temperature high-pressure gas comprising:

an upright cylindrical pressure vessel;

an inlet port for introducing particle laden gas into said pressure vessel;

a clean gas outlet port in said pressure vessel;

a pair of cross sectional tube sheets dividing said pressure vessel into an upper gas inlet chamber, a lower end chamber and a filtration chamber between said upper and lower chambers;

a plurality of gas-permeable filter tubes disposed between said pair of cross sectional tube sheets arranged to connect the gas inlet chamber with said lower end chamber;

at least one intermediate cross sectional tube sheet disposed between said pair of cross sectional tube sheets for supporting said filter tubes and dividing said filtration chamber into at least two separate clean gas compartments adapted to receive clean gas through said gas permeable filter tubes;

an inlet end of a clean gas outlet conduit protruding into each clean gas compartment, all clean gas conduits being arranged to lead clean gas from the respective compartments into one common clean gas outlet port in the pressure vessel;

a venturi arranged in the inlet ends of each clean gas outlet conduit; and a nozzle disposed in said inlet end of said clean gas outlet conduits and arranged to introduce high-pressure gas pluses into a throat portion of the venturi.

* * * * *